(12) United States Patent
Herget et al.

(10) Patent No.: US 7,828,324 B2
(45) Date of Patent: Nov. 9, 2010

(54) GAS GENERATOR, IN PARTICULAR FOR A VEHICLE OCCUPANT RESTRAINT SYSTEM, AND METHOD OF ACTIVATING A VEHICLE OCCUPANT RESTRAINT SYSTEM

(75) Inventors: Christian Herget, Mettenheim (DE); Detlef Last, Muehldorf (DE)

(73) Assignee: TRW Airbag Systems GmbH, Aschau Am Inn (DE)

( * ) Notice: Subject to any disclaimer, the term of this patent is extended or adjusted under 35 U.S.C. 154(b) by 152 days.

(21) Appl. No.: 12/009,108

(22) Filed: Jan. 16, 2008

(65) Prior Publication Data

US 2008/0169630 A1 Jul. 17, 2008

(30) Foreign Application Priority Data

Jan. 16, 2007 (DE) .................. 10 2007 002 374

(51) Int. Cl.
*B60R 21/26* (2006.01)
(52) U.S. Cl. ..................................... 280/737
(58) Field of Classification Search .......... 102/530, 102/531; 280/736, 737, 740, 741
See application file for complete search history.

(56) References Cited

U.S. PATENT DOCUMENTS

| | | | | |
|---|---|---|---|---|
| 4,796,912 A | * | 1/1989 | Lauritzen et al. | 280/736 |
| 5,582,806 A | * | 12/1996 | Skanberg et al. | 422/305 |
| 5,593,180 A | | 1/1997 | Cuevas et al. | |
| 5,630,619 A | * | 5/1997 | Buchanan et al. | 280/741 |
| 5,709,406 A | * | 1/1998 | Buchanan | 280/737 |
| 5,794,973 A | * | 8/1998 | O'Loughlin et al. | 280/737 |
| 5,918,900 A | * | 7/1999 | Ennis | 280/736 |
| 6,213,503 B1 | * | 4/2001 | Zimbrich et al. | 280/736 |
| 6,227,562 B1 | | 5/2001 | Shirk et al. | |
| 6,231,078 B1 | * | 5/2001 | Kokeguchi | 280/736 |
| 6,253,683 B1 | * | 7/2001 | Fukabori | 102/530 |
| 6,607,213 B2 | * | 8/2003 | Yamamori et al. | 280/736 |

(Continued)

FOREIGN PATENT DOCUMENTS

DE 10002083 11/2000

(Continued)

*Primary Examiner*—Paul N Dickson
*Assistant Examiner*—Robert A Coker
(74) *Attorney, Agent, or Firm*—Tarolli, Sundheim, Covell & Tummino LLP

(57) ABSTRACT

A gas generator, in particular for a vehicle occupant restraint system, has a pyrotechnical propellant (16), a combustion chamber (12) filled with the pyrotechnical propellant (16), an igniter (14) associated with the combustion chamber (12), a pressure chamber (18), filled with compressed gas, which is adjacent to the combustion chamber (12) and has a first opening (22) remote from the combustion chamber (12) closed by a first diaphragm (26), the diaphragm (26) being destroyed upon activation of the igniter (14), and a second pressure chamber (28) which is filled with compressed gas and has a second opening (34) closed by a second diaphragm (36). The second diaphragm (36) is likewise destroyed upon activation of the igniter (14), and the openings (22, 34) and the gas volumes of the pressure chambers (18, 28) are adapted so that compressed gas flows out from the second pressure chamber (28) for a longer period than compressed gas from the first pressure chamber (18) to increase a gas supply time of the gas generator (10). Further, a method of activating a vehicle occupant restraint system is described.

18 Claims, 1 Drawing Sheet

U.S. PATENT DOCUMENTS

| | | | |
|---|---|---|---|
| 6,672,616 B2 * | 1/2004 | Jonsson et al. | 280/737 |
| 6,820,898 B2 * | 11/2004 | Dinsdale et al. | 280/737 |
| 7,641,230 B2 * | 1/2010 | Schramm et al. | 280/736 |
| 2002/0130502 A1 * | 9/2002 | Jonsson et al. | 280/737 |
| 2003/0062713 A1 * | 4/2003 | Young et al. | 280/736 |
| 2003/0178827 A1 * | 9/2003 | Dinsdale et al. | 280/736 |
| 2004/0026910 A1 * | 2/2004 | Englbrecht et al. | 280/736 |
| 2005/0146123 A1 | 7/2005 | Bergmann et al. | |

FOREIGN PATENT DOCUMENTS

| | | |
|---|---|---|
| EP | 0792776 | 9/1997 |
| EP | 0949126 | 10/1999 |
| EP | 1544060 | 6/2005 |

* cited by examiner

GAS GENERATOR, IN PARTICULAR FOR A VEHICLE OCCUPANT RESTRAINT SYSTEM, AND METHOD OF ACTIVATING A VEHICLE OCCUPANT RESTRAINT SYSTEM

TECHNICAL FIELD

The present invention relates to a gas generator, in particular for a vehicle occupant restraint system, including a combustion chamber filled with a pyrotechnical propellant and an igniter associated with the combustion chamber and further including a pressure chamber, filled with compressed gas, which is adjacent to the combustion chamber and has an opening remote from the combustion chamber and closed by a first diaphragm, the diaphragm being destroyed upon activation of the igniter. The present invention further relates to a method of activating a vehicle occupant restraint system.

BACKGROUND OF THE INVENTION

A generic gas generator is disclosed in EP 1 544 060 A1. Upon activation of the igniter, the pyrotechnical propellant in the combustion chamber is burned off and the compressed gas generated thereby will destroy a diaphragm arranged between the combustion chamber and the pressure chamber. This produces an abrupt pressure drop by which a so-called shock wave is generated which abruptly propagates through the pressure chamber to destroy another diaphragm arranged at the end of the pressure chamber remote from the combustion chamber. A mixture of compressed gas and hot gas will then emerge from the associated port. Such hybrid gas generators distinguish themselves by small structural dimensions and rapid escape of the gas, but have rather short gas supply times.

The present invention, by contrast, provides a gas generator and a method of activating a vehicle occupant restraint system in which both a rapid supply of gas immediately upon activation and also a long gas supply time are ensured.

BRIEF SUMMARY OF THE INVENTION

According to the invention, a gas generator, in particular for a vehicle occupant restraint system, has a pyrotechnical propellant, a combustion chamber filled with the pyrotechnical propellant, an igniter associated with the combustion chamber, a pressure chamber, filled with compressed gas, which is adjacent to the combustion chamber and has a first opening remote from the combustion chamber closed by a first diaphragm, the diaphragm being destroyed upon activation of the igniter, and a second pressure chamber which is filled with compressed gas and has a second opening closed by a second diaphragm. The second diaphragm is likewise destroyed upon activation of the igniter, and the openings and the gas volumes of the pressure chamber are adapted so that compressed gas flows out from the second pressure chamber for a longer period than compressed gas from the first pressure chamber to increase a gas supply time of the gas generator.

In the gas generator according to the invention, upon activation of the igniter a shock wave is generated which destroys both the first diaphragm of the first pressure chamber and the second diaphragm, which closes the opening of the second pressure chamber. Owing to the compressed gas flowing out of the second pressure chamber, the mass flow rate increases and, since this gas preferably has a low temperature, the gas supply time of the gas generator increases. In particular, the design according to the invention allows to even attain gas supply times of more than 5 seconds, which are of advantage, e.g., in side gas bag modules. In addition, the gas generator according to the invention distinguishes itself by a comparatively small structural space since the gas generated in the combustion chamber and the gas stored in the first pressure chamber is now only needed for a rapid first filling of, for instance, a gas bag. The compressed gas from the second pressure chamber, which flows out for a longer period of time, then compensates for any pressure loss in the gas bag, e.g. by cooling or leakages.

Preferably, a shock wave is generated by activation of the igniter and destruction of the first diaphragm so that an immediate pressure drop is provided which is responsible for the shock wave. The high pressure outside the pressure chamber generated by the igniter immediately stands vis-à-vis the lower pressure in the pressure chamber when the first diaphragm is destroyed. This pressure difference generates a shock front which is extremely fast and runs through the pressure chamber. The second diaphragm is destroyed by the shock front also called shock wave and not by a pressure increase like in conventional inflators.

Preferably, the combustion chamber, the first pressure chamber and the second pressure chamber are arranged one behind the other in the axial direction; in that case the shock wave for destroying the diaphragms will also propagate in the axial direction. In particular, the two pressure chambers are completely separated from each other spatially.

The first pressure chamber may be separated from the combustion chamber by a third diaphragm. Upon activation of the igniter, it is this third diaphragm which is then destroyed first by the compressed gas produced in the combustion chamber, which causes the shock wave.

According to the preferred embodiment, the first and second diaphragms are provided on discharge ends, immediately facing each other, of the pressure chambers. In particular, the diaphragms are arranged at a comparatively small distance from each other, and no element (e.g. a filter) is arranged between the diaphragms, whereby it is ensured that the second diaphragm is reliably opened by the shock wave.

Advantageously, a diffusor section having a plurality of discharge ports is provided, which is arranged between the first and second pressure chambers and may serve to connect the two pressure chambers with each other. In addition, the shared diffusor section results in a particularly small overall length and in reduced costs.

Preferably, the diffusor section is arranged on the side of the first pressure chamber facing away from the combustion chamber.

In order to further reduce the rate at which the compressed gas flows out of the second pressure chamber, the latter may have a throttle arranged in the immediate vicinity of the second diaphragm.

Since the compressed gas in the first pressure chamber primarily serves for a rapid first filling of a vehicle occupant restraint system, the first pressure chamber may have a smaller volume than the second pressure chamber.

Moreover, it is possible for the first and second pressure chambers to be filled with different compressed gases. In this way, the outflow behavior can be optimized by selecting a compressed gas having a particularly high outflow rate for the first pressure chamber and a compressed gas having a lower outflow rate for the second pressure chamber.

Different outflow rates of the compressed gases may be attained for instance in that the compressed gas in the first pressure chamber has a lower viscosity than the compressed gas in the second pressure chamber. The use of helium, for instance, is possible for the first pressure chamber; for the second pressure chamber it is conceivable to use argon, the relative outflow rate of which is lower by a factor of about 3. As an alternative, the second pressure chamber may also be filled with liquefied gas (such as $CO_2$).

The cross-section of the second opening should be smaller than that of the first opening; the cross-section of the second opening here means the minimum cross-section thereof, which determines the effective outflow cross-section. In the exemplary embodiment, the latter is specified by the opening of a throttle arranged in the area of the second diaphragm.

To make sure that the second diaphragm is destroyed by the shock wave at all events, the second diaphragm should be larger than the first diaphragm.

The following relationship preferably applies to the minimum distance a between the discharge ends of the pressure chambers:

$$a = \frac{d_1}{4} \cdot \sqrt{\frac{M_2}{M_1}} + \frac{d_2}{4} \cdot \sqrt{\frac{M_1}{M_2}}$$

where $d_1$ and $d_2$ are the diameters of the first and second openings, respectively, and $M_1$ and $M_2$ are the molar masses of the compressed gas in the first and second pressure chambers, respectively. In the special case where the same compressed gas is used in both pressure chambers, the distance between the discharge ends thus amounts to at least a quarter of the sum of the diameters of the openings closed by the diaphragms.

According to a second aspect of the invention, a method of activating a vehicle occupant restraint system is provided. The method comprises the following steps: providing a gas generator which includes a combustion chamber having an associated igniter, providing a first compressed gas container close to the combustion chamber, providing a second compressed gas container remote from the combustion chamber, generating a shock wave by activating the igniter and by destroying a diaphragm closing the first compressed gas container and facing the igniter, opening a further diaphragm of the first compressed gas container by the shock wave, opening a diaphragm of the second compressed gas container by the shock wave, and outflow of compressed gas from both the first and the second compressed gas containers, with compressed gas flowing out from the second compressed gas container for a longer period than from the first compressed gas container to increase a gas supply time of the gas generator.

BRIEF DESCRIPTION OF THE PREFERRED EMBODIMENT

Figure 1:
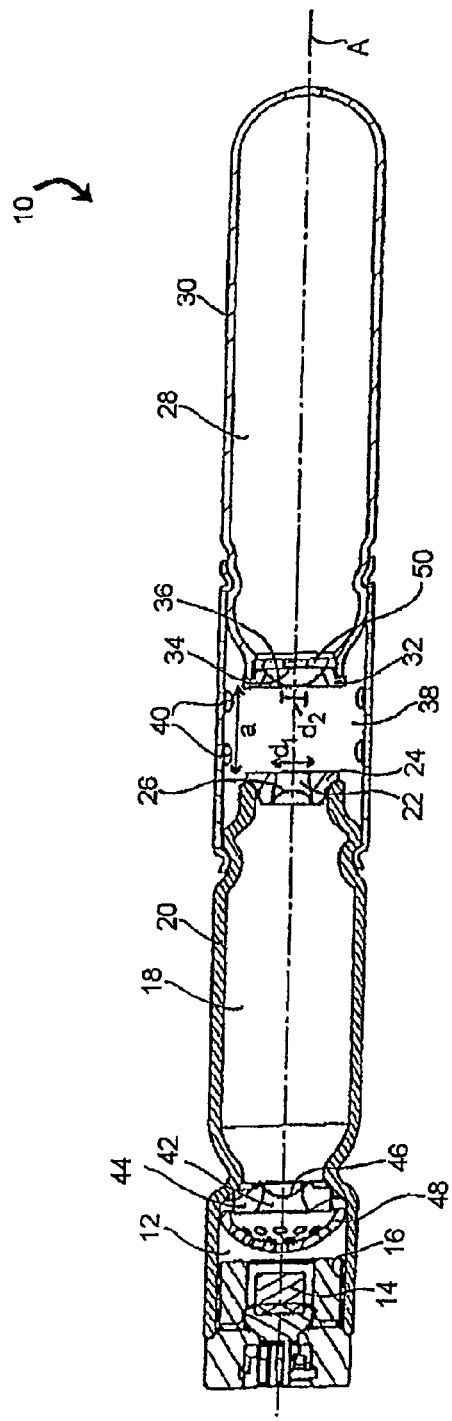
FIG. 1 shows a longitudinal section through a gas generator according to the invention.
Figure 2:
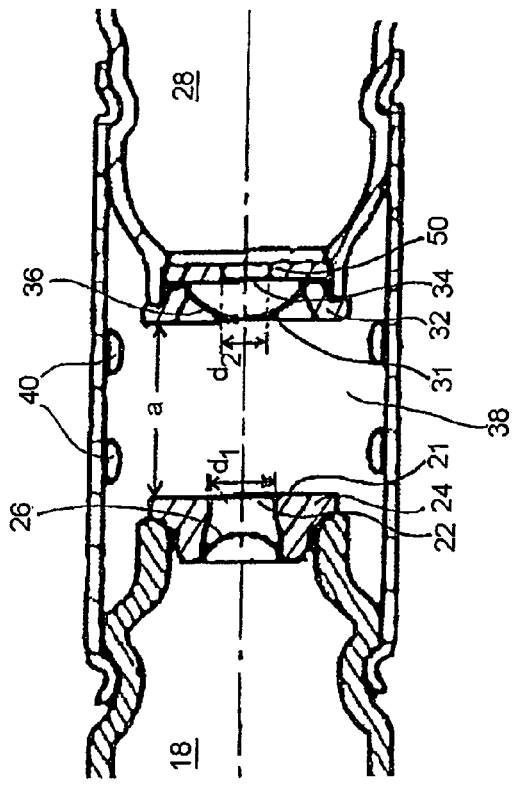
FIG. 2 shows a detail from FIG. 1 on an enlarged scale.

The Figures illustrate a gas generator 10 according to the invention, in the form of an elongated tubular gas generator which more particularly serves for filling a gas bag in a vehicle occupant restraint system. The gas generator 10 has a combustion chamber 12 with an associated igniter 14 which here is more particularly inserted in the combustion chamber 12. The combustion chamber 12 is filled with a pyrotechnical propellant 16 and, in the axial direction A, is adjacent to a first pressure chamber 18, filled with a compressed gas, which is externally defined by a substantially cylindrical wall 20. The pressure chamber 18 has an opening 22 at a discharge end 21 on a front face, remote from the combustion chamber 12, the opening 22 being delimited by a skirt 24 and closed off by a first diaphragm 26. Provided behind the first pressure chamber 18, as viewed from the combustion chamber 12 in the axial direction A, is a second pressure chamber 28, filled with compressed gas, the periphery of which is defined by a cylindrical wall 30 and which is designed to be completely separate from the first pressure chamber 18. The second pressure chamber 28 has a discharge end 31 on a front face, facing the first pressure chamber 18, and is provided at the discharge end 31 with a throttle 50 which is adjacent to a skirt 32 and has an opening 34 formed therein which is closed off by a second diaphragm 36. This means that the first and second diaphragms 26 and 36 are provided at discharge ends 21, 31, facing each other, of the pressure chambers 18, 28, the second diaphragm 36 being larger than the first diaphragm 26. In this arrangement, the opening 34, which is closed off by the second diaphragm 36, has an outflow cross-section or diameter $d_2$ which is smaller than the outflow cross-section or diameter $d_1$ of the opening 22 closed off by the first diaphragm 26. As can be further seen in FIG. 1, owing to its shorter length the first pressure chamber 18 has a smaller volume than the second pressure chamber 28.

The first and the second pressure chambers 18, 28 are preferably filled with different compressed gases, the compressed gas in the first pressure chamber 18 having a lower viscosity than the compressed gas in the second pressure chamber 28. For example, the first pressure chamber 18 may be filled with helium and the second pressure chamber 28 with argon.

The first pressure chamber 18, the opening 22, and the compressed gas contained therein constitute a first compressed gas container; the second pressure chamber 28, its opening 34, and the compressed gas therein constitute a second compressed gas container.

To attach the separate second pressure chamber 28 to the first pressure chamber 18, a diffusor section 38 is provided which is arranged between the two pressure chambers 18, 28 and is crimped to the respective cylindrical walls 20 and 30 thereof. The diffusor section 38 is likewise made to be substantially cylindrical, with the same diameter as the first and second pressure chambers 18, 28, and has a plurality of discharge ports 40 in its peripheral wall. The diffusor section 38 is arranged on the side of the first pressure chamber 18 facing away from the combustion chamber 12.

The following applies to the minimum distance a between the discharge ends 21 and 31, which should be kept in order to prevent the gas streams from the first and from the second pressure chambers 18, 28 from impeding each other:

$$a = \frac{d_1}{4} \cdot \sqrt{\frac{M_2}{M_1}} + \frac{d_2}{4} \cdot \sqrt{\frac{M_1}{M_2}},$$

where $d_1$ and $d_2$ are the diameters of the first and second openings 22, 34, respectively, and $M_1$ and $M_2$ are the molar masses of the compressed gas in the first and second pressure chambers 18, 28, respectively. The minimum distance a should also not be overly exceeded since in view of the shock wave produced in the first pressure chamber 18, a bridging distance to the second pressure chamber 28 should desirably be as small as possible. Therefore the length of the diffusor section 38 substantially corresponds to this minimum distance a. When helium is used in the first pressure chamber 18 and argon in the second pressure chamber 28, a calculation of the minimum distance a, on the assumption that $d_2=0.7\ d_1$, results in $a \approx 0.85\ d_1$. When identical gases are used, the following applies: $a=0.25\ (d_1+d_2)=0.425\ d_1$.

Provided between the combustion chamber 12 and the pressure chamber 18 is another opening 42 which is delimited by a skirt 44 and closed off by a third diaphragm 46. Furthermore, a screen 48 is arranged in front of the diaphragm 46 on the combustion chamber side of the opening 42.

For activating the vehicle occupant restraint system associated with the gas generator 10, the igniter 14 is activated and the pyrotechnical propellant 16 in the combustion chamber is burned off. The hot compressed gas generated in the process will destroy the third diaphragm 46, resulting in an abrupt pressure drop, which produces a shock wave. The shock wave abruptly propagates from left to right in the axial direction A through the first pressure chamber 18 to destroy the first diaphragm 26, so that as a result a mixture of the hot gas produced and the compressed gas stored in the first pressure chamber 18 (or the first compressed gas container) can reach the diffusor section 38. Owing to the comparatively small distance a between the discharge ends 21, 31 of the pressure chambers 18, 28, the shock wave can bridge this distance to also destroy the diaphragm 36 closing off the opening 34. For this reason, compressed gas (in this case cold gas) can flow out of the second pressure chamber 28 (or the second compressed gas container) as well.

As a result of the higher viscosity of the compressed gas in the second pressure chamber 28, which is tantamount to a lower discharge rate, and because of the larger volume of the second pressure chamber 28 and the throttle 50, compressed gas flows out of the second pressure chamber both more slowly and for a longer period than from the first pressure chamber 18, which increases the gas supply time of the gas generator 10. The lower temperature also causes the compressed gas to flow out of the second pressure chamber 28 more slowly. The design according to the invention allows to achieve gas supply times of even more than 5 seconds; preferably, the gas supply time amounts to approximately 100 milliseconds. Nevertheless, owing to the compressed gas produced in the combustion chamber 12 and that stored in the first pressure chamber 18, which flows out rapidly, the gas generator 10 provides for a rapid filling of, e.g., a gas bag.

The invention claimed is:

1. A gas generator, in particular for a vehicle occupant restraint system, comprising
    a pyrotechnical propellant (16),
    a combustion chamber (12) filled with said pyrotechnical propellant (16),
    an igniter (14) associated with said combustion chamber (12),
    a first pressure chamber (18), filled with compressed gas, which is adjacent to said combustion chamber (12) and has a first opening (22) remote from said combustion chamber (12) closed by a first diaphragm (26), said diaphragm (26) being destroyed upon activation of said igniter (14),
    a second pressure chamber (28) which is filled with compressed gas and has a second opening (34) closed by a second diaphragm (36),
    said second diaphragm (36) being likewise destroyed upon activation of said igniter (14), and said openings (22, 34) and the gas volumes of said pressure chambers (18, 28) being adapted so that compressed gas flows out from said second pressure chamber (28) for a longer period than compressed gas from said first pressure chamber (18) to increase a gas supply time of said gas generator (10), and
    a third diaphragm (46) that separates said first pressure chamber (18) from said combustion chamber (12).

2. The gas generator according to claim 1, wherein a shock wave is generated by activation of said igniter (14) and destruction of said first diaphragm (26), said second diaphragm (36) being destroyed by said shock wave.

3. The gas generator according to claim 1, wherein said combustion chamber (12), said first pressure chamber (18) and said second pressure chamber (28) are arranged one behind the other in an axial direction (A).

4. The gas generator according to claim 1, wherein said pressure chambers (18, 28) comprise discharge ends (21, 31), immediately facing each other, said first and second diaphragms (26, 36) being provided on said discharge ends (21, 31).

5. The gas generator according to claim 4, wherein the following applies to a minimum distance a between said discharge ends (21, 31) of said pressure chambers (18, 28):

$$a = \frac{d_1}{4} \cdot \sqrt{\frac{M_2}{M_1}} + \frac{d_2}{4} \cdot \sqrt{\frac{M_1}{M_2}}.$$

6. The gas generator according to claim 1, wherein a diffuser section (38) having a plurality of discharge ports (40) is provided, which is arranged between said first and second pressure chambers (18, 28).

7. The gas generator according to claim 6, wherein said diffuser section (38) is arranged on a side of said first pressure chamber (18) facing away from said combustion chamber (12).

8. The gas generator according to claim 1, wherein said second pressure chamber (28) has a throttle (50) arranged in an immediate vicinity of said second diaphragm (36).

9. The gas generator according to claim 1, wherein said first pressure chamber (18) has a smaller volume than said second pressure chamber (28).

10. The gas generator according to claim 1, wherein said first and second pressure chambers (18, 28) are filled with different compressed gases.

11. The gas generator according to claim 10, wherein a compressed gas in said first pressure chamber (18) has a lower viscosity than a compressed gas in said second pressure chamber (28).

12. The gas generator according to claim 1, wherein an opening (34) covered by said second diaphragm (36) is smaller in cross-section than an opening covered by said first diaphragm (26).

13. The gas generator according to claim 1, wherein said second diaphragm (36) is larger than said first diaphragm (26).

14. The gas generator according to claim 1, wherein a diffuser section (38) having a plurality of discharge ports (40) is provided, which is arranged between said first and second pressure chambers (18, 28) such that upon activation of said igniter (14) fluid communication between each of the discharge ports (40) and each of said first and second openings (22, 34) is provided.

15. A method of activating a vehicle occupant restraint system, comprising the following steps:
    providing a gas generator (10) which includes a combustion chamber (12) having an associated igniter (14),
    providing a first compressed gas container close to said combustion chamber (12),
    providing a second compressed gas container remote from said combustion chamber (12), generating a shock wave by activating said igniter (14) and by destroying a diaphragm (46) that separates the first pressure chamber (18) from the combustion chamber (12), the diaphragm (46) closing said first compressed gas container and facing said igniter (14), opening a further diaphragm (26) of said first compressed gas container by said shock wave, the further diaphragm (26) closing an opening (22) of said first compressed gas container remote from said combustion chamber (12), opening a diaphragm (36) of said second compressed gas container by said shock wave, and producing an outflow of compressed gas from both said first and said second compressed gas containers, with compressed gas flowing out from said second compressed gas container for a longer period than from said first compressed gas container to increase a gas supply time of said gas generator (10).

16. A gas generator, in particular for a vehicle occupant restraint system, comprising:

a pyrotechnical propellant (16), a combustion chamber (12) filled with said pyrotechnical propellant (16), a first pressure chamber (18), filled with compressed gas, which is adjacent to said combustion chamber (12) and has a first opening (22) remote from said combustion chamber (12) closed by a first diaphragm (26), and a second pressure chamber (28) which is filled with compressed gas and has a second opening (34) closed by a second diaphragm (36), a diffuser section (38) having a plurality of discharge ports (40) which is arranged between said first and second pressure chambers (18, 28), and a single igniter (14), the single igniter (14) being associated with said combustion chamber (12), and a third diaphragm (46) that separates said first pressure chamber (18) from said combustion chamber (12).

17. The gas generator according to claim 16, wherein said single igniter (14), said combustion chamber (12), said first pressure chamber (18), said diffuser section and said second pressure chamber (28) are arranged one behind the other in an axial direction (A).

18. A gas generator, in particular for a vehicle occupant restraint system, comprising a pyrotechnical propellant (16), a combustion chamber (12) filled with said pyrotechnical propellant (16), an igniter (14) associated with said combustion chamber (12), a first pressure chamber (18), filled with compressed gas, which is adjacent to said combustion chamber (12) and has a first opening (22) remote from said combustion chamber (12) closed by a first diaphragm (26), said diaphragm (26) being destroyed upon activation of said igniter (14), and a second pressure chamber (28) which is filled with compressed gas and has a second opening (34) closed by a second diaphragm (36), said second diaphragm (36) being likewise destroyed upon activation of said igniter (14), and said openings (22, 34) and the gas volumes of said pressure chambers (18, 28) being adapted so that compressed gas flows out from said second pressure chamber (28) for a longer period than compressed gas from said first pressure chamber (18) to increase a gas supply time of said gas generator (10), wherein said pressure chambers (18, 28) comprise discharge ends (21, 31), immediately facing each other, said first and second diaphragms (26, 36) being provided on said discharge ends (21, 31), wherein the following applies to a minimum distance a between said discharge ends (21, 31) of said pressure chambers (18, 28):

$$a = \frac{d_1}{4} \cdot \sqrt{\frac{M_2}{M_1}} + \frac{d_2}{4} \cdot \sqrt{\frac{M_1}{M_2}}.$$

* * * * *